United States Patent [19]

Sigg

[11] Patent Number: 4,471,671
[45] Date of Patent: Sep. 18, 1984

[54] GEARING ARRANGEMENT FOR A GRINDING APPARATUS, ESPECIALLY A BOWL-TYPE GRINDER

[75] Inventor: Hans Sigg, Mutschellen, Switzerland

[73] Assignee: MAAG Gear-Wheel & Machine Co. Ltd., Zürich, Switzerland

[21] Appl. No.: 434,914

[22] Filed: Oct. 18, 1982

[30] Foreign Application Priority Data

Nov. 2, 1981 [CH] Switzerland ............ 6978/81

[51] Int. Cl.³ .................... F16H 1/28; F16H 3/44
[52] U.S. Cl. ................................ 74/801; 74/788
[58] Field of Search ............... 74/788, 785, 801; 241/110, 117, 121

[56] References Cited

U.S. PATENT DOCUMENTS

| 2,044,203 | 6/1936 | Boykin, Jr. ............... 74/801 |
| 3,339,853 | 9/1967 | Mischanski .............. 241/110 |
| 4,429,594 | 4/1981 | Heller ...................... 74/801 X |

FOREIGN PATENT DOCUMENTS

| 676963 | 12/1963 | Canada ................. 241/110 |
| 486898 | 11/1929 | Fed. Rep. of Germany ....... 74/785 |
| 2828401 | 1/1979 | Fed. Rep. of Germany ....... 241/117 |

*Primary Examiner*—Allan D. Herrmann
*Assistant Examiner*—D. Wright
*Attorney, Agent, or Firm*—Werner W. Kleeman

[57] ABSTRACT

A gearing arrangement for a grinding apparatus, especially a bowl-type grinder or grinding mill, comprises a lower housing portion and an upper housing portion secured to the lower housing portion. At the upper housing portion there is rotatably mounted a support or mounting plate for a grinding bowl or receptacle. This support or mounting plate is mounted at the upper housing portion for rotational movement about a substantially vertical axis of rotation. The support or mounting plate is driven by angular gearing, for instance bevel gearing, and planetary gearing arranged in the lower housing portion. The planetary gearing contains an outer central gear which is arranged upon the lower housing portion as a part of the upper housing portion and is constructed as a support ring of an axial bearing for the support or mounting plate.

10 Claims, 3 Drawing Figures

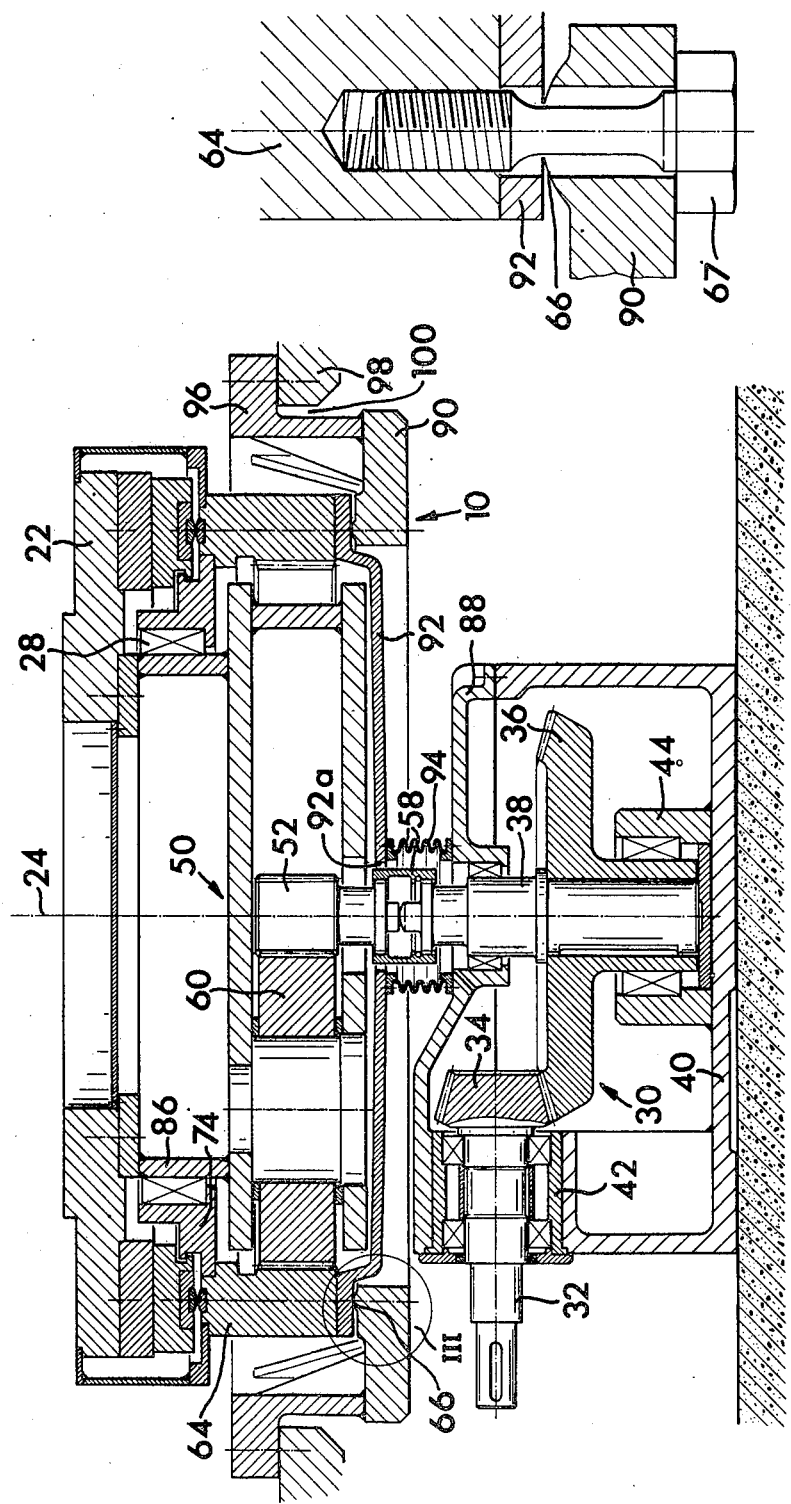

GEARING ARRANGEMENT FOR A GRINDING APPARATUS, ESPECIALLY A BOWL-TYPE GRINDER

BACKGROUND OF THE INVENTION

The present invention relates to a new and improved construction of a gearing arrangement for a grinding apparatus, especially for a bowl-type grinder or grinding mill.

Generally speaking, the gearing arrangement of the present development is of the type comprising a lower housing portion and an upper housing portion attached to the lower housing portion. Mounted upon the upper housing portion by means of an axial bearing and a radial bearing is a mounting or support plate for a grinding bowl or receptacle, this mounting plate having a substantially vertical axis of rotation. Additionally, there is provided angular gearing containing a substantially horizontal drive shaft and a power take-off shaft arranged essentially coaxially with respect to the mounting or support plate. There is also provided planetary gearing containing a sun gear which is coupled with the power take-off shaft of the angular gearing, at least one planetary gear, a planetary gear support which is coupled with the mounting or support plate, and a substantially ring-shaped outer central gear which is affixed to the lower housing portion.

According to a known construction of gearing arrangement of this character for a bowl-type grinding mill or grinding apparatus, as disclosed for instance in German patent publication No. 2,716,025, published Oct. 19, 1978, the lower housing portion possesses a cylindrical supporting wall in which there is mounted the horizontal drive shaft of angular gearing and directly thereabove there is secured the ring-shaped outer central gear of the planetary gearing. Accordingly, there are also housed above the angular gearing, within the lower housing portion, all of the remaining gears of the planetary gearing. The lower housing portion possesses a flange above the planetary gearing. This flange is bolted to a corresponding flange of the upper housing portion. This upper housing portion likewise has a cylindrical wall which encloses the rotatable support or mounting plate as well as its axial and radial bearings. The planetary gear support which is arranged in the lower housing portion is suspended in a pendulum-like fashion at the mounting plate by means of an axially arranged traction rod and is only centered in that the planetary gears mounted therein mesh with the outer central gear. The sun gear of the planetary gearing is supported in axial direction upon the power take-off shaft of the angular gearing by means of crowned surfaces and is coupled by a double-tooth clutch or coupling with such power take-off shaft. Centering of the sun gear is likewise accomplished by the planetary gears which mesh therewith.

In this way there is ensured that the sun gear is accommodated to the position of the planetary gears which, in turn, accommodate themselves to the position of the outer central gear. However, the strived for objective that the tooth flanks of all gears uniformly support the loads is not attainable with the operating conditions which arise with a bowl-type grinding mill or grinding apparatus. In particular, during operation there additionally act upon the axial bearing, apart from the extremely large weight of the mounting or support plate and the grinding bowl, the weight of a roller framework together with the rolls which roll upon the grinding bowl. This weight is also frequently intensified in that, the roller framework is downwardly biased or loaded by means of, for instance, a hydraulic device, in order to increase the roller pressure. Therefore, there can act upon the axial bearing of a bowl-type grinding mill of the aforementioned type, axial forces in the order of magnitude of 400 tons which, with the heretofore known constructions of gearing arrangements or transmissions for bowl-type grinding apparatus, can cause bending moments in the upper housing portion which are transmitted by means of the lower housing portion to the ring-shaped outer central gear. These transmitted forces in any event then tend to deform the central gear if the supporting housing walls are not designed to be extraordinarily strong which, accordingly, constitutes an extremely expensive construction. Therefore, there cannot be ensured that the gears of the planetary gearing will uniformly carry the loads over their entire tooth width in the presence of all operating conditions which arise.

SUMMARY OF THE INVENTION

Therefore, with the foregoing in mind it is a primary object of the present invention to provide a new and improved construction of gearing arrangement for a grinding apparatus, especially a bowl-type grinder or grinding mill, which is not afflicted with the aforementioned drawbacks and limitations of the prior art construction.

Another and more specific object of the present invention is directed to a new and improved construction of gearing arrangement for a bowl-type grinding apparatus, which is constructed in such a manner that the forces transmitted by means of the axial bearing, notwithstanding the modest constructional expenditure for the housing walls, essentially do not have any affect upon the localized tooth contact or bearing of the teeth of the gearing arrangement.

Now in order to implement these and still further objects of the invention, which will become more readily apparent as the description proceeds, the gearing arrangement of the present development is manifested by the features that, the outer central gear is arranged upon the lower housing portion as a part of the upper housing portion and is constructed as a support ring or ring member of the axial bearing.

The ring-shaped outer central gear therefore is not only a part of the planetary gearing, as was the case for the state-of-the-art gearing arrangement, but at the same time constitutes the housing upper portion or, in any event, an appreciable part thereof, and furthermore, constitutes a part of the axial bearing. The forces taken-up by the axial bearing are thus downwardly transmitted through the ring-shaped outer central gear and, even though such is thus markedly subjected to compression loads, the tooth bearing or contact of the teeth of the planetary gear remain practically unaffected by the axial forces of the bowl-type grinding apparatus which arise during operation. This is so because bending moments, which can conically deform the outer central gear and, consequently, could impair the localized tooth contact of the teeth, are at least extensively avoided. At the same time the fabrication costs for the upper housing portion can be maintained low because the ring-shaped outer central gear itself forms an essential part of the upper housing portion.

According to a further preferred construction of the invention the mean diameter of the outer central gear coincides with the mean diameter of the axial bearing and the mean diameter of a ring-shaped or annular support surface for the outer central gear and which is formed at the lower housing portion. Consequently, the axial forces which are transmitted by means of the axial bearing cannot produce any bending moments in the outer central gear.

With the described state-of-the-art gearing arrangement for a bowl-type grinding apparatus, there only can be avoided with great difficulty, if at all, an axial offset between the radial bearing arranged in the upper housing portion and the outer central gear arranged in the lower housing portion. In order to also eliminate this drawback the inventive arrangement and design of the outer central gear is preferably further constructed such that the outer central gear also is constructed as a support ring or support ring member for the radial bearing.

This design is advantageously realized according to a practical construction where the outer central gear possesses at its upper side or surface a centrally arranged ring-shaped or annular groove as well as a respective ring-shaped shoulder located radially within and radially externally of said ring-shaped groove. This ring-shaped or annular groove accommodates a support ring of the axial bearing, the inner ring-shaped shoulder supports a holder ring for the radial bearing, and the outer ring-shaped shoulder supports a sealing collar or rim which produces a sealing action in the direction of the mounting or support plate.

With the heretofore described prior art gearing arrangement for a bowl-type grinding mill or grinder the mounting of the drive shaft of the angular gearing in the supporting wall of the lower housing portion causes shifting of the drive shaft in the presence of deformations of such wall. Such deformations of the supporting wall are produced, on the one hand, by virtue of the moments of the axial forces of the bowl-type grinding mill which arise with such known arrangement and, on the other hand, by virtue of the rotational moments which act upon the outer central gear of the planetary gearing which is secured to such supporting wall. The thus caused shifting of the drive shaft of the angular gearing impairs the localized tooth bearing or contact of its gear teeth and produces, also in this case, avoidable noises and wear.

In order to overcome this shortcoming, a further feature of the invention contemplates supporting the outer central gear by means of the lower housing portion independent of the angular gearing. The drive shaft and power take-off shaft of such angular gearing are mounted upon a common socket or pedestal separated from the lower housing portion.

This construction of the invention can be advantageously further improved upon in that the outer central gear can be removed from the upper housing portion in conjunction with the axial bearing, the radial bearing, the mounting or support plate and the planetary gear support or carrier which is secured thereto.

With the outer central gear dismantled the angular gearing together with its socket can be advantageously removed out of the lower housing portion.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a vertical axial sectional view, analogous to the illustration of FIG. 1, through a second exemplary embodiment of gearing arrangement constructed according to the invention; and FIG. 3 is an enlarged detailed showing of a portion of the arrangement of FIG. 2 contained within a circle designated by reference character III in such FIG. 2.

DETAILED DESCRIPTION OF THE PREFERRED EMBODIMENTS

Figure 1:
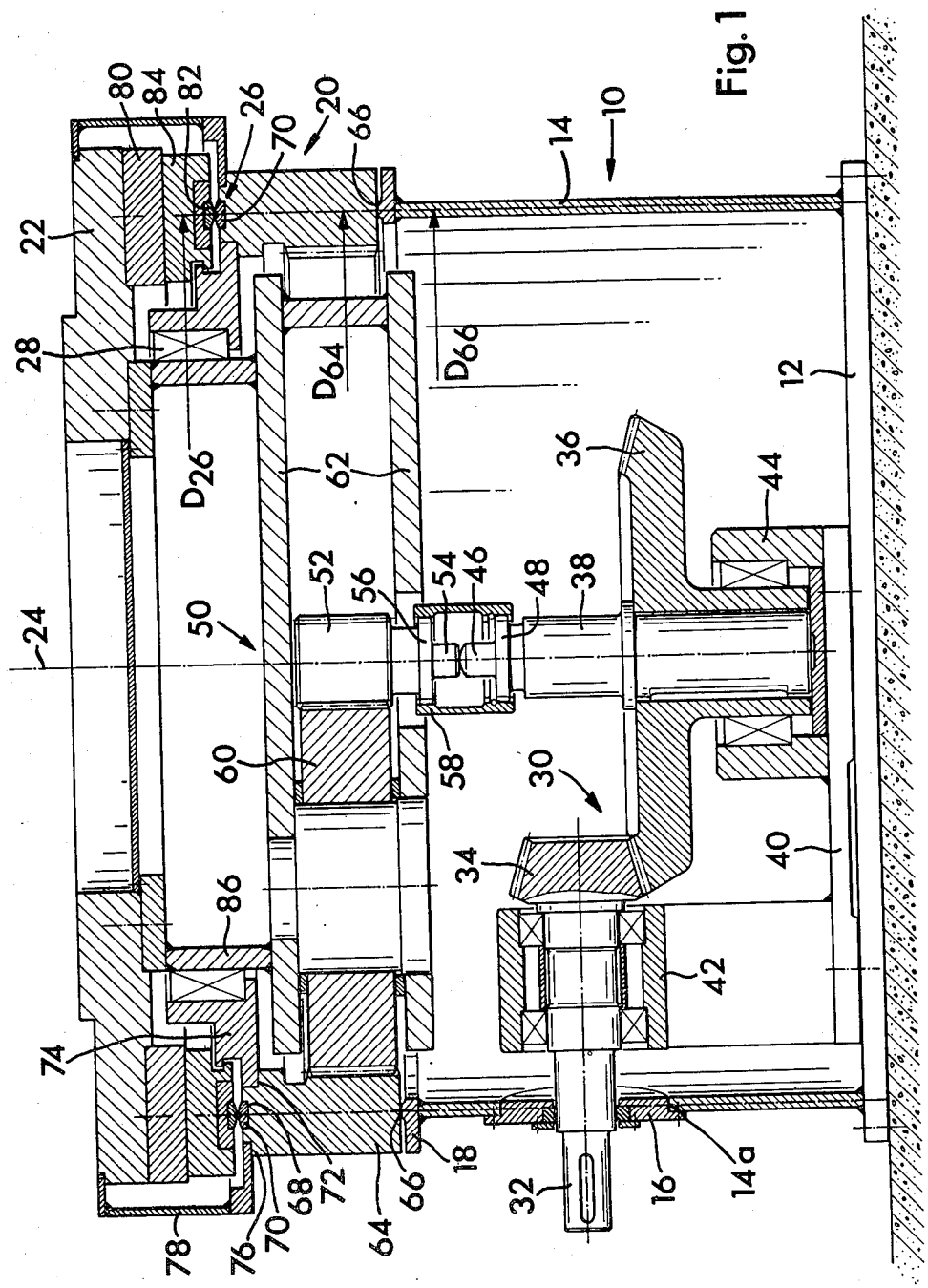
FIG. 1 is a vertical axial sectional view through a first exemplary embodiment of a gearing arrangement for a bowl-type grinding apparatus or grinding mill.

Describing now the drawings, the exemplary embodiment of gearing arrangement for a grinding apparatus, especially a bowl-type grinding mill or grinder, as has been illustrated in FIG. 1, will be seen to comprise a lower housing portion 10 containing a base or bottom plate 12 and a substantially cylindrical housing wall 14. This housing wall 14 is provided with a lateral opening or port 14a which is closed by a suitable cover member or closure 16. The upper region of the housing wall 14 terminates at a flange or flange member 18. Additionally, the bowl-type grinding mill-gearing arrangement contains an upper housing portion 20 upon which there is rotatably mounted for rotational movement about a substantially vertical axis of rotation 24, by means of an axial bearing 26 and a radial bearing 28, a mounting or support plate or plate member 22. This mounting or support plate 22 is constructed in known manner for mounting and centering a not particularly illustrated conventional grinding bowl or receptacle which possesses at its upper side a more or less pronounced concave ring-shaped travel track for grinding rollers or rolls.

Arranged in the lower housing portion 10 is an angular gearing arrangement 30 which, in the illustrated exemplary embodiment, is constituted by bevel gearing or gears. Belonging to the angular gearing arrangement 30 is a substantially horizontal drive shaft 32 which extends radially outwardly with radial play, however while sealed, through the cover member 16 and which can be coupled with a not particularly illustrated but conventional drive motor. A bevel pinion 34, constructed or mounted at the inner end of the drive shaft 32, meshes with a substantially plate-shaped bevel gear 36 which is affixed to a substantially vertical take-off shaft 38 which is essentially coaxially arranged with respect to the axis of rotation 24. The angular gearing or angular gearing arrangement 30 possesses a common socket or pedestal 40 for a bearing 42 in which there is mounted the drive shaft 32 and for a bearing 44 in which there are mounted and supported in downward direction the bevel gear 36 and the power take-off shaft 38. At the upper end of the power take-off shaft 38 there is formed a support pin or pin member 46 which is crowned or domed at its top region as well as clutch teeth 48.

Above the angular gearing arrangement or angular gearing 30 there is arranged the planetary gearing arrangement or planetary gearing 50. Belonging to the planetary gearing 50 is a sun gear 52 which is arranged essentially coaxially with respect to the vertical axis of rotation 24. The sun gear 52 is provided with a downwardly protruding support pin 54 which is substantially planar at its lower or bottom face and bears upon the crowned upper surface or face of the support pin 46. This support pin or pin member 54 has operatively associated there with a further clutch tooth arrangement or clutch teeth 56 which is connected with the clutch teeth or clutch teeth arrangement 48 by an internally-toothed clutch or coupling socket or sleeve 58. The clutch socket 58 bears, against axial displacement, downwardly at the clutch teeth 48 of the power take-off shaft 38.

The sun gear 52 meshes with three planetary gears 60 which are mounted at a substantially equidistant angular spacing at a planetary gear support or carrier member 62. All of the planetary gears 60, of which only one has been particularly illustrated, mesh with an internally-toothed, substantially ring-shaped outer central gear 64 which bears upon a ring-shaped or annular support surface 66 formed at the upper side or face of the flange 18 and is bolted or otherwise suitably connected with such flange or flange member 18. The outer central gear 64 has a mean diameter $D_{64}$ which essentially corresponds to the mean diameter $D_{26}$ of the axial bearing 26 and to the mean diameter $D_{66}$ of the ring-shaped or annular support surface 66.

At the upper end face or top surface of the ring-shaped outer central gear 64 there is machined or otherwise appropriately formed a central ring-shaped or annular groove 68 which receives a lower support ring 70 of the axial bearing 26. Inwardly thereof there is formed at the central gear 64 an inner ring-shaped or annular shoulder 72 at which there is supported and centered a holder ring or ring member 74 which, in turn, supports and centers the radial bearing 28. Furthermore, an outer ring-shaped or annular shoulder 76 is formed at the central gear 64, this ring-shaped shoulder 76 supporting and centering a sealing collar or rim member 78. The mounting or support plate 22 seals in the direction of the sealing collar or rim member 78 which is stationary.

Also belonging to the axial bearing 26 is an upper support ring or ring member 82 which tiltably or rockably bears upon the lower support ring member 70 and is embedded in a lower bearing ring or ring member 84 upon which there slidingly bears an upper bearing ring or ring member 80 which is affixed to the mounting or support plate member 22. At the underside of the mounting plate member 22 there is additionally attached a bearing rim member 86 which is mounted in the radial bearing 28 and at which there is attached the planetary gear support or carrier member 60.

In this way the outer central gear 64, constituting part of the planetary gearing or gearing arrangement 50, participates in the transmission of a drive output to the mounting or support plate member 22. Additionally, the outer central gear 64 takes-up the axial loads of the mounting or support plate 22 by means of the axial bearing 26 and conducts such loads to the lower housing portion 10, without there occurring any bending moments. Furthermore, the outer central gear 64 constitutes an essential part of the upper housing portion 20 for the protection of the planetary gearing 50 and the radial bearing 28, and finally, the outer central gear 64 supports and centers the radial bearing 28. The outer central gear 64 therefore fulfills a total of four different functions.

Nothing is changed even if the lower housing portion 10 is provided, instead of with the cylindrical housing wall 14 shown in the arrangement of FIG. 1, for instance with a truncated conical-shaped or truncated pyramid-shaped housing wall or if such housing wall, as the supporting part, is replaced by individual supports or the supports illustrated in FIG. 2.

According to the modified construction depicted in FIG. 2, the socket or pedestal 40 of the angular gearing or gearing arrangement 30 is upwardly augmented or extended to form a housing which is closed by means of a cover member or closure 88. Just as was the case with the arrangement of FIG. 1, here also the lower housing portion 10 possesses a substantially ring-shaped or annular support surface 66 which, as shown in FIG. 2, is however formed at a sturdy or robust flange member 90 and the ring-shaped outer central gear 64 is not directly supported, but by means of a base plate 92, which downwardly closes the planetary gearing 50.

The power take-off shaft 38 of the angular gearing 30 is mounted in the cover member 88 and extends upwardly therethrough. The clutch or coupling socket 58 extends through a central recess 92a in the base plate 92 and is surrounded in radial spaced relationship therefrom by a concertina-type bellows or diaphragm 94 which sealingly connects the cover member 88 with the base plate 92, as shown.

The flange or flange member 90 is affixed to a substantially ring-shaped insert member 96 which is suspended in a recess or opening 100 of a storey ceiling 98 of the building or structure housing the equipment. Instead of the storey ceiling 98 there can be provided a frame which supports the ring-shaped insert member 96 or directly supports the flange member 90.

In any event, the ring-shaped outer central gear 64 is designed to be sturdy or powerful enough that it is capable of taking-up, as a supporting part or component, essentially free of deformations the axial compression or pressure of the bowl-type grinding mill. In the event that deformations arise at the lower housing portion 10, then such are kept away from the outer central gear 64 in that, the ring-shaped or annular support surface 66 is dimensioned to be narrow and the threaded bolts 67 or the like located between the lower housing portion 10 and the outer central gear 64, to the extent that they are even present, are designed to be bending pliant, for instance in the manner illustrated in FIG. 3.

While there are shown and described present preferred embodiments of the invention, it is to be distinctly understood that the invention is not limited thereto, but may be otherwise variously embodied and practiced within the scope of the following claims. Accordingly,

What I claim is:

1. A gearing arrangement for a grinding apparatus, especially a bowl-type grinding mill, comprising:
    a lower housing portion;
    an upper housing portion secured to the lower housing portion;
    a mounting plate for a grinding bowl and having a substantially vertical axis of rotation;
    an axial bearing;
    a radial bearing;
    said mounting plate being mounted by means of said axial bearing and said radial bearing at said upper housing portion;
    angular gearing possessing a substantially horizontal drive shaft and a power take-off shaft arranged substantially coaxially with respect to said mounting plate;
    planetary gearing comprising:

a sun gear coupled with the power take-off shaft of the angular gearing;

at least one planetary gear;

a planetary gear support connected with said mounting plate; and a substantially ring-shaped outer central gear secured to the lower housing portion; and said outer central gear being arranged as part of the upper housing portion upon the lower housing portion and being constructed as a support ring for the axial bearing.

2. The gearing arrangement as defined in claim 1, further including:

said axial bearing having a mean diameter;

a substantially ring-shaped support surface for the outer central gear formed at the lower housing portion;

said ring-shaped support surface having a mean diameter; and the outer central gear having a mean diameter at least approximately coinciding with the mean diameter of the axial bearing and the mean diameter of said ring-shaped support surface for the outer central gear.

3. The gearing arrangement as defined in claim 2, wherein:

said outer central gear is constructed as a support ring for the radial bearing.

4. The gearing arrangement as defined in claim 3, wherein:

said outer central gear has an upper surface;

said upper surface of said outer central gear possessing a substantially centrally arranged ring-shaped groove and radially within and radially externally of said ring-shaped groove possessing a respective ring-shaped shoulder defining an inner ring-shaped shoulder and an outer ring-shaped shoulder;

a support ring provided for said axial bearing;

said ring-shaped groove receiving said support ring of said axial bearing;

a holder ring provided for said radial bearing;

said inner ring-shaped shoulder supporting said holder ring for said radial bearing;

a sealing collar which seals in the direction of the mounting plate; and said outer ring-shaped shoulder supporting said sealing collar.

5. The gearing arrangement as defined in claim 1, wherein:

said outer central gear is constructed as a support ring for the radial bearing.

6. The gearing arrangement as defined in claim 5, wherein:

said outer central gear has an upper surface;

said upper surface of said outer central gear possessing a substantially centrally arranged ring-shaped groove and radially within and radially externally of said ring-shaped groove possessing a respective ring-shaped shoulder defining an inner ring-shaped shoulder and an outer ring-shaped shoulder;

a support ring provided for said axial bearing;

said ring-shaped groove receiving said support ring of said axial bearing;

a holder ring provided for said radial bearing;

said inner ring-shaped shoulder supporting said holder ring for said radial bearing;

a sealing collar which seals in the direction of the mounting plate; and said outer ring-shaped shoulder supporting said sealing collar.

7. The gearing arrangement as defined in claim 1, wherein:

said outer central gear is supported independent of said angular gearing by means of said lower housing portion;

a common socket member separated from said lower housing portion; and said drive shaft and said power take-off shaft being mounted upon said common socket member.

8. The gearing arrangement as defined in claim 7, wherein:

said outer central gear is removable from said lower housing portion in conjunction with said axial bearing, said radial bearing, said mounting plate and said planetary gear support which is connected with said mounting plate.

9. The gearing arrangement as defined in claim 8, wherein:

with the outer central gear removed the angular gearing together with said socket member can be removed out of said lower housing portion.

10. The gearing arrangement as defined in claim 1, wherein:

said angular gearing comprises bevel gearing.

* * * * *